United States Patent
Yamaguchi

(10) Patent No.: US 7,773,145 B2
(45) Date of Patent: Aug. 10, 2010

(54) AUTO FOCUS UNIT AND CAMERA

(75) Inventor: Satoru Yamaguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 554 days.

(21) Appl. No.: 11/677,191

(22) Filed: Feb. 21, 2007

(65) Prior Publication Data
US 2007/0196089 A1    Aug. 23, 2007

(30) Foreign Application Priority Data
Feb. 22, 2006    (JP) .............................. 2006-045277

(51) Int. Cl.
H04N 5/232    (2006.01)
H04N 5/225    (2006.01)
H04N 5/228    (2006.01)
G03B 17/00    (2006.01)
G03B 39/00    (2006.01)

(52) U.S. Cl. .................. 348/345; 348/352; 348/354; 348/169; 348/208.14; 396/51; 396/95

(58) Field of Classification Search ................ 348/345, 348/352, 354, 169, 208.14, 51, 95
See application file for complete search history.

(56) References Cited

U.S. PATENT DOCUMENTS

| | | | | |
|---|---|---|---|---|
| 5,187,585 A * | 2/1993 | Kaneda et al. | ............... | 348/347 |
| 5,216,460 A * | 6/1993 | Yoshimura et al. | ........... | 396/123 |
| 5,239,332 A * | 8/1993 | Muramatsu et al. | ........... | 396/95 |
| 5,291,235 A * | 3/1994 | Uenaka | ........................ | 396/95 |
| 5,629,735 A * | 5/1997 | Kaneda et al. | .............. | 348/350 |
| 6,072,642 A | 6/2000 | Shirai | | |
| 6,351,605 B1 | 2/2002 | Ogi et al. | | |
| 6,874,955 B2 | 4/2005 | Morishita | | |
| 7,079,188 B2 * | 7/2006 | Shiraishi et al. | ............. | 348/350 |
| 2004/0090551 A1 * | 5/2004 | Yata | ............................ | 348/354 |
| 2006/0083506 A1 * | 4/2006 | Kanayama | ................... | 396/121 |

OTHER PUBLICATIONS

U.S. Appl. No. 11/677,183 to Yamaguchi, which was filed on Feb. 21, 2007.

* cited by examiner

Primary Examiner—David L Ometz
Assistant Examiner—Quang V Le
(74) Attorney, Agent, or Firm—Greenblum & Bernstein, P.L.C.

(57) ABSTRACT

An auto focus unit, comprising a pursuit block, a scanning area setting block, a change area setting block, a permission block, and a lens driver, is provided. The pursuit block pursues the movements of a target object. The scanning area setting block designates a part of an object-area as a scanning area at first timing. After first timing, the scanning area setting block is able to reset the scanning area to the now location where the targeted object has moved. The change area setting block defines an area of a predetermined range as a change area at the first timing. The permission block orders the scanning area setting block to reset the scanning area when the location where the targeted object moved is outside of the change area. The lens driver orders a focus lens to move so that an optical image of the scanning area is focused on.

20 Claims, 9 Drawing Sheets

AUTO FOCUS UNIT AND CAMERA

BACKGROUND OF THE INVENTION

1. Field of the Invention

The present invention relates to an auto focus unit and a camera that adjusts the position of a focus lens in an optical system automatically so that an optical image of an object appearing through the optical system can be brought into focus.

2. Description of the Related Art

A recent digital camera has an auto focus function. Several different methods exist for carrying out this auto focus function, one of which is briefly explained below. A scanning area is fixed upon the light-receiving surface of an imaging device where optical images are captured. Whenever the imaging device captures the optical image, a focus lens is moved along an optical axis and a contrast value in the scanning area is detected. The detected contrast values corresponding to a plurality of positions of the focus lens are recorded in a memory. One position of the focus lens, of which the contrast value is highest among the recorded contrast values, is selected as the in-focus position of the focus lens, and the focus lens is moved to that position. In the above method, it is necessary to consider a plurality of detected contrast values in the fixed scanning area.

In addition, an image-pursuit function is known. By the image-pursuit function, the image of a targeted object that moves in a space corresponding to an entire image to be captured is pursued from a plurality of sequentially captured image. A moving object within the entire image to be captured can be focused on by carrying out the auto focus function in cooperation with the image-pursuit function. For example, the scanning area is moved to capture an optical image of a targeted object according to the movements of the targeted object within the entire image by carrying out the image-pursuit function, while the auto focus function is carried out based on the moved scanning area. In order to auto focus on a moving object, a plurality of optical images should be captured so that a plurality of contrast values can be detected before the scanning area is moved.

However, the scanning area may be moved before the detection of a plurality of contrast values if the quantity of a hand shake or magnification of a photographic optical system is large. Consequently, it is problematic to auto focus on a moving an object in an unstable manner.

SUMMARY OF THE INVENTION

Therefore, an object of the present invention is to provide an auto focus unit and a camera capable of focusing on a moving object in a stable manner.

According to the present invention, an auto focus unit, comprising a pursuit block, a scanning area setting block, a change area setting block, a permission block, and a lens driver, is provided. The pursuit block pursues the movements of a targeted object within a frame of an entire image to be photographed. The scanning area setting block designates at least a part of an object-area as a scanning area at first timing. An image of the targeted object is at the object-area within the frame of the entire image. The scanning area is used for focusing an object on a light-receiving surface. The scanning area setting block is able to reset the scanning area after the first timing to a new location within the frame of the entire image where the targeted object has moved. The change area setting block defines an area of a predetermined range as a change area at the first timing. The area of a predetermined range is decided based on the location of the targeted object inside the frame of the entire image. The permission block orders the scanning area setting block to reset the scanning area again when the location, where the targeted object moved after the first timing, is outside of the change area. The lens driver orders a focus lens to move so that an optical image of the scanning area is focused upon the light-receiving surface.

Further, the auto focus unit comprises a receiver and a target setting block. The receiver receives an image signal from an imaging device. The imaging device generates the image signal when the imaging device receives an optical image of an object upon the light-receiving surface of the imaging device. The target setting block designates the targeted object within a frame of a first entire image as the targeted object. The first entire image corresponds to a first image signal. The receiver receives the first image signal at first timing. The pursuit block pursues the targeted object by detecting the location of the targeted object inside the frame of second entire image. The second entire image corresponds to a second image. The second image signal is generated at second timing after the first timing. The scanning area setting block sets at least a part of the object-area as the scanning area. An image of the targeted object within the frame of the first entire image is located in the object-area. The scanning area setting block is able to reset the scanning area to a new location within the frame of the second entire image where the targeted object has moved. The change area setting block designates an area of a predetermined range based on the location of the targeted object within the frame of the first entire image as the change area. The permission block orders the scanning area setting block to reset the scanning area of the second entire image when. The location, where the targeted object has moved within the frame of the second entire image, is outside of the change area.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
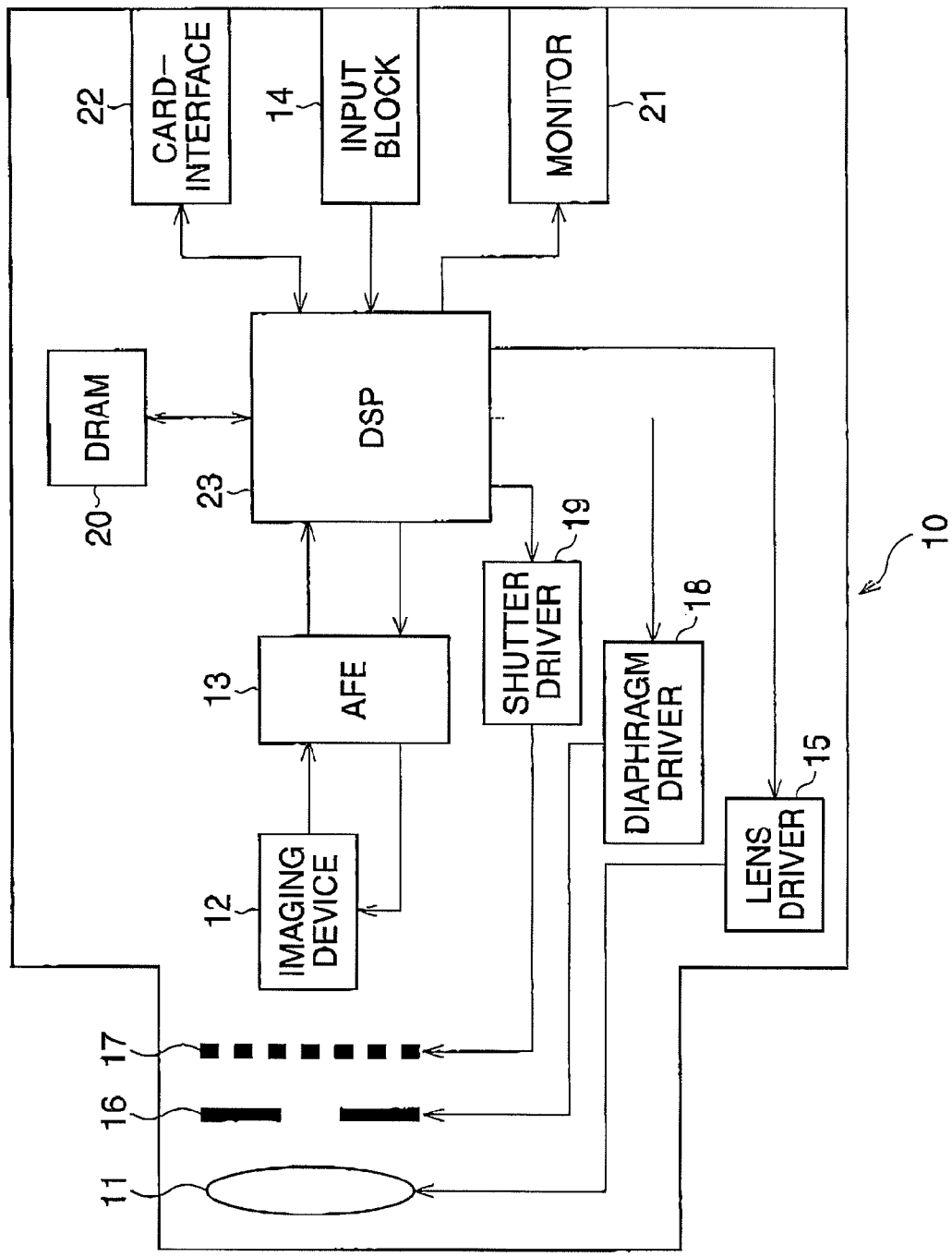
FIG. 1 is a block diagram showing the internal structure of a digital camera having an auto focus unit of an embodiment of the present invention.

The present invention is described below with reference to the embodiment shown in the drawings.

In FIG. 1, a digital camera 10 comprises a photographic optical system 11, an imaging device 12, an analog front end (AFE) 13, a DSP 23, an input block 14, a lens driver 15, and other components. The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

The photographic optical system 11 comprises plural lenses, including a focus lens (not depicted) and a zoom lens (not depicted). The focus lens and the zoom lens are movable along an optical axis of the photographic optical system 11. An optical image of an object can be focused on the light-receiving surface of the imaging device 12 by moving the focus lens. The focal length of the photographic optical system 11 is adjusted by moving the zoom lens.

The focus lens and the zoom lens can be moved along the optical axis by either a user or a lens driver 15. More commonly, the focus lens is moved automatically to carry out an auto focus function described later.

A diaphragm 16 and a shutter 17 are mounted between the photographic optical system 11 and the imaging device 12. The intensity of light, made incident on the light-receiving surface of the imaging device 12, is adjusted by adjusting the aperture ratio of the diaphragm 16. An optical image reaches the light-receiving surface by opening the shutter 17, and an optical image is shielded from the light-receiving surface by closing the shutter 17. The diaphragm driver 18 drives the diaphragm 16 so that the aperture ratio can be adjusted. The shutter driver 19 drives the shutter 17 so that the shutter can be opened and closed.

Incidentally, the lens driver 15, the diaphragm driver 18, and the shutter driver 19 are connected to the DSP 23. The DSP 23 controls each operation of the lens driver 15, the diaphragm driver 18 and the shutter driver 19.

The imaging device 12 is electrically connected to the DSP 23 via the AFE 13. A clock signal is sent from the DSP 23 to the AFE 13. The AFE 13 generates a frame signal and an imaging device driving signal based on the received clock signal. The imaging device driving signal is sent to the imaging device 12. The imaging device 12, which is driven based on the imaging device driving signal, generates an image signal synchronized with the frame signal.

The generated image signal is sent to the AFE 13.

The AFE 13 carries out correlated double sampling and gain adjustment on the image signal. In addition, the image signal is converted into image data, which is digital data. The image data is sent to the DSP 23.

The DSP 23 is connected to a dynamic random access memory (DRAM) 20, which is used as a work memory for data processing. The image data received by the DSP 23 is temporarily stored in the DRAM 20. The DSP 23 carries out predetermined data processing on the image data stored in the DRAM 20.

The DSP 23 is connected to a monitor 21. The image data, having undergone predetermined data processing, is sent to the monitor 21. An image, corresponding to the image data received by the monitor 21, can be displayed on the monitor 21.

The DSP 23 is connected to a card-interface 22. When a release operation, described in detail later, is carried out, the image data, having undergone predetermined data processing, is stored in a memory card (not depicted) which is connected to the card-interface 22.

The DSP 23 is connected to the input block 14 where a user inputs operational commands for handling the digital camera 10. The input block 14 comprises a release button (not depicted), a multi-functional cross-key (not depicted), a power button (not depicted), and other buttons. The DSP 23 orders each component of the digital camera 10 to carry out a necessary operation according to a user's commands input to the input block 14.

By depressing the release button halfway, a first switch (not depicted) is switched on and exposure adjustment and focusing adjustment are then carried out. In the exposure adjustment, adjustment of the aperture ratio of the diaphragm 16, adjustment of shutter speed, and gain adjustment for the image signal are carried out, in the focusing adjustment, the position of the focus lens is adjusted so that an optical image of a targeted object can be focused on the light-receiving surface. Focusing adjustment will be described in detail later.

Further, by fully depressing the release button, a second switch (not depicted) is switched on. The release operations, such as opening and closing the shutter 17, and capturing a static optical image by the imaging device 12, are then carried out.

Figure 2:
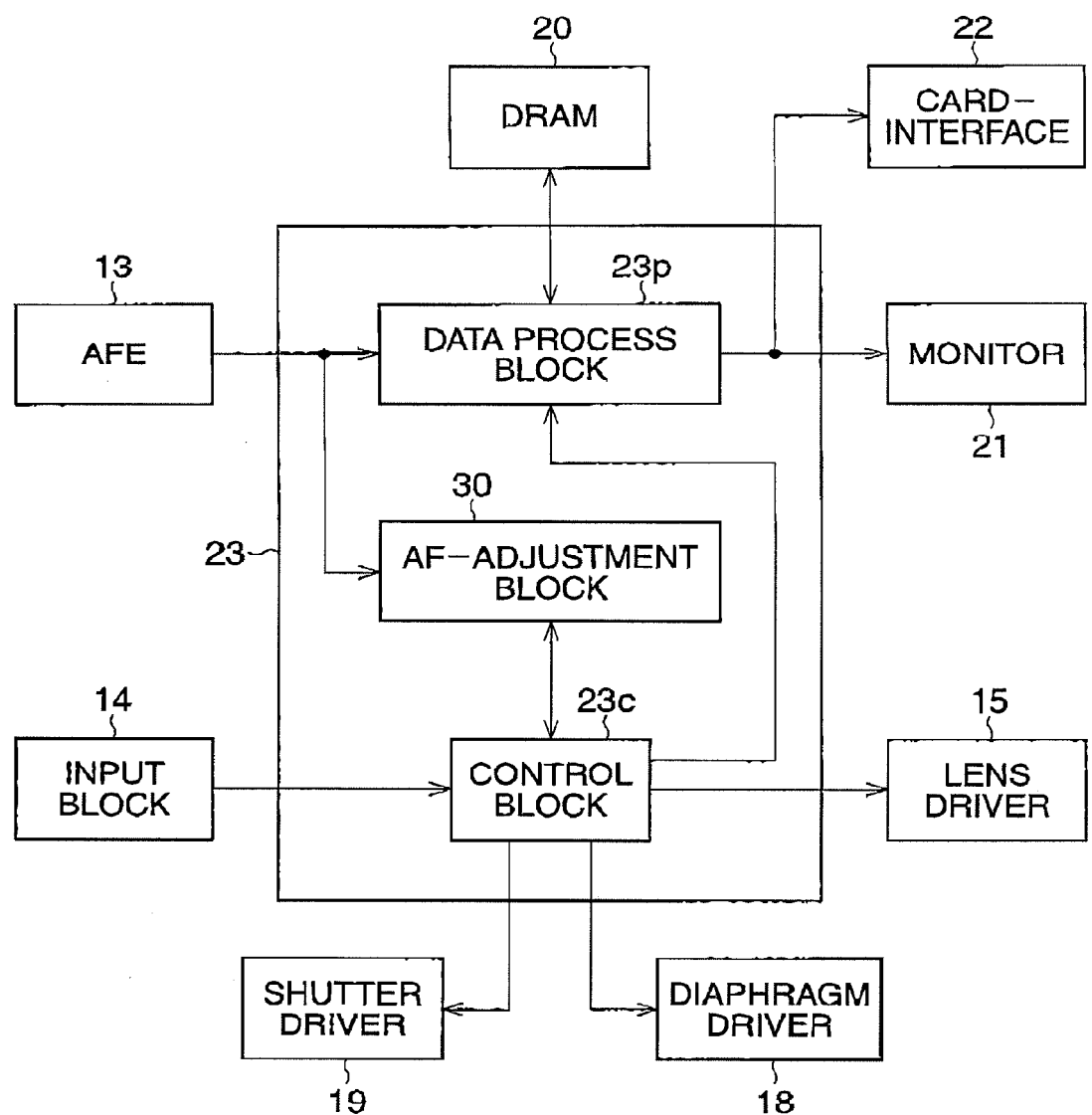
FIG. 2 is a block diagram showing the internal structure of the DSP.
Figure 3:
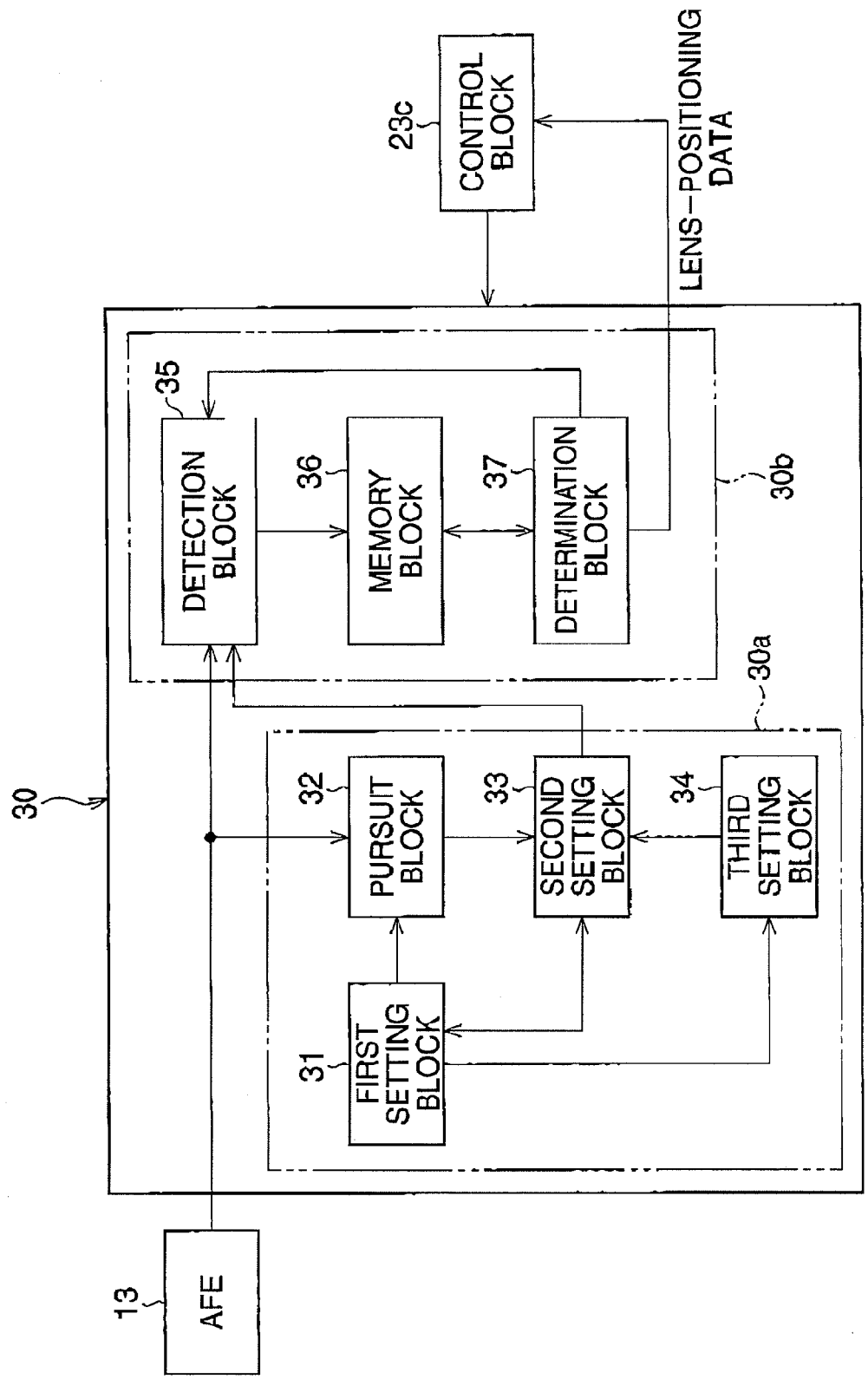
FIG. 3 is a block diagram showing the internal structure of the AF-adjustment block.

The internal structure of the DSP 23 is explained in detail below. In FIG. 2, the DSP 23 comprises a data process block 23p, an AF-adjustment block 30, and a control block 23c.

The data process block 23p receives the image data sent from the APE 13 and stores the received image data in the DRAM 20. In addition, the data process block 23p carries out predetermined data processing on the stored image data. Further, the data process block 23p sends the image data, having undergone predetermined data processing, to the monitor 21 or the memory card via the card-interface 22.

The AF-adjustment block 30 receives the image data sent from the AFE 13. The digital camera 10 has normal auto focus and pursuit auto focus functions. By carrying out the normal auto focus function, an object, located in a fixed partial area of a frame of the entire image to be captured, is brought into focus. By carrying out the pursuit auto focus function, an object, moving in the frame of the entire image to be captured, is brought into focus. Selection of either the normal auto focus or the pursuit auto focus functions is carried out by an operational command to the input block 14. The AF-adjustment block 30 determines the position of the focus lens based on the received image data so that the targeted object is brought into focus on the light-receiving surface.

The control block 23c receives an input signal according to an operational command sent from the input block 14. The control block 23a controls the data process block 23p, the AF-adjustment block 30, and each component of the digital camera 10 according to the received input signal.

For example, the control block 23c controls the diaphragm driver 18 to drive the diaphragm 16 and controls the shutter driver 19 to open and close the shutter 17 in the exposure adjustment.

Further, the control block 23c controls the lens driver 15 to move the focus lens in the focusing adjustment. In the focusing adjustment, the control block 23c receives lens-positioning data corresponding to the position of the focus lens that is determined by the AF-adjustment block 30. The control block 23c controls the lens driver 15 based on the received lens-positioning data.

Next, the structure and operation of the AF-adjustment block 30 are explained in detail below. The AF-adjustment block 30 comprises a scanning area setting part 30a and a position determination part 30b.

Figure 4:
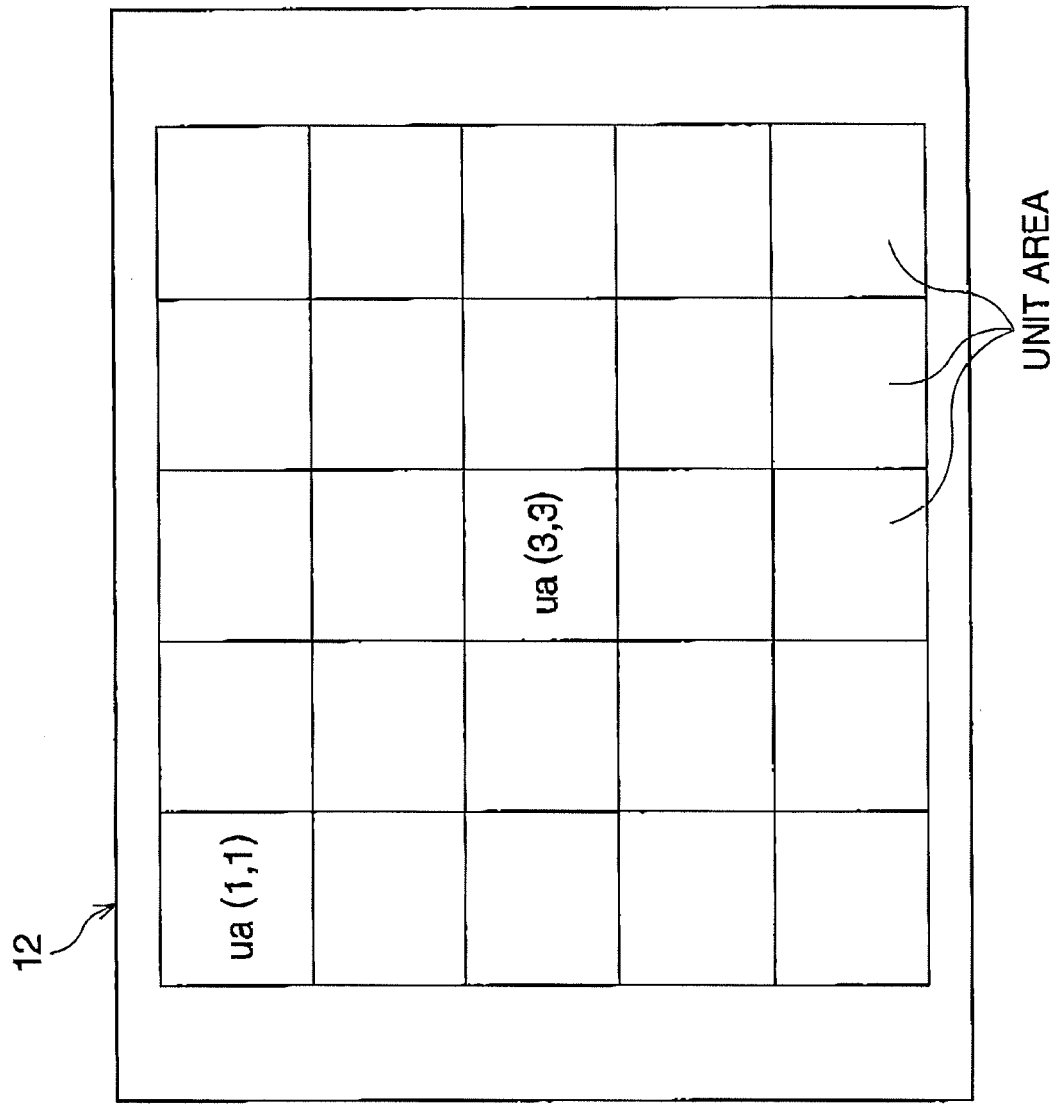
FIG. 4 illustrates an external structure of the light-receiving surface of the imaging device.

The scanning area setting part 30a selects one unit area from a plurality of unit areas on the light-receiving surface and designates the selected unit area as the scanning area. Incidentally, a unit area is one of twenty five areas into which the effective imaging area of the light-receiving surface is divided, and which are arranged in five rows and five columns, as shown in FIG. 4. Hereinafter, the unit area, arranged in the mth row from upper and the nth column from left side, is referred to as ua (m, n). Incidentally, the scanning area is used for capturing a partial image where a contrast value is detected in order to adjust the position of the focus lens.

The position determination part 30b determines the position of the focus lens so that the object captured by the scanning area is brought into focus.

The scanning area setting part 30a comprises a first setting block 31, a pursuit block 32, a second setting block 33, and a third setting block 34. The position determination part 30b comprises a detection block 35, a memory block 36, and a determination block 37. All components are controlled by the control block 23c.

The scanning area setting block 30a fixes one unit area as the scanning area by operating the first setting block 31 and the second setting block 33 when the normal auto focus function is carried out. In addition, the scanning area setting block 30a pursues a targeted object moving in the frame of the entire image to be captured, and designates one unit area for capturing the pursued optical image at that moment by operating the first setting block 31, the pursuit block 32, the second setting block 33, and the third setting block 34 when the pursuit auto focus function is carried out. Whether the normal or pursuit auto focus functions are carried out, the position determination block 30b determines the position of the focus lens so that the optical image of the object captured by the scanning area is brought into focus, as described above.

When the normal auto focus function is carried out, the first setting block 31, the second setting block 33, the detection block 35, the memory block 36, and the determination block 37 work as follows.

The first setting block 31 designates one unit area among the twenty five unit areas as a standard area. The standard area is used for determination of the scanning area. The standard area is selected from all twenty five unit areas based on a command input to the input block 14. For example, the ua(3, 3), which is arranged in the center of the effective imaging area of the imaging device 12, is selected as the initial standard area. An input signal for selecting the standard area is sent to the first setting block 31 via the control block 23c from the input block 14.

Data corresponding to the selected standard area is then sent to the second setting block 33. The second setting block 33 designates the standard area as the scanning area in the normal auto focus function.

Data corresponding to the designated scanning area is sent to the detection block 35, which also receive the image data from the AFE 13. The detection block 35 detects a contrast value of the optical image captured by the scanning area of the imaging device 12 based on the received image data. Incidentally, the detecting block 35 begins the contrast value detection process when it receives the first image data soon after the first switch is switched on.

The detected contrast value is recorded in connection with the position of the focus lens in the memory block 36. Incidentally, the position of the focus lens is detected by the lens driver 15 and data corresponding to the detected position of the focus lens is sent to the memory block 36 via the control block 23c.

The focus lens is moved two separate times during the successive capture of an optical image. After the focus lens is moved initially, another contrast value of the scanning area is detected by the detection block 35 and is recorded in the memory block 36. Since then, similarly, the movement of the focus lens, the detection of the contrast values and the storage of the record in the memory block 36 are carried out.

A plurality of the recorded contrast values are read by the determination block 37 which then determines the maximum value among the read contrast values. The determination block 37 determines the position of the focus lens corresponding to the determined maximum contrast value as the in-focus position of the focus lens. The lens-positioning signal corresponding to the determined in-focus position of the focus lens is sent to the control block 23c.

Incidentally, the determination block 37 orders the detection block 35 to repeatedly detect for a contrast value until the maximum contrast value is detected. The detection of a contrast value and the movement of the focus lens are described in detail below.

The focus lens is moved through a minimum shift quantity, per which the position of the focus lens can be adjusted, in a first direction along the optical axis either toward or away from the imaging device 12 until the imaging device 12 captures the optical image that had previously been captured. Incidentally, the first direction is toward either the far or near end. After detecting the contrast value at the moved posit ion or the focus lens, the focus lens is moved through two minimum shift quantities in a second direction opposite to the first direction. After moving, the contrast value is again detected and recorded.

Once the contrast values of three frames of the captured optical image have been detected, the determination block 37 reads the three contrast values recorded in the memory block 36 and determines the highest of the three contrast values.

If the contrast value of the captured optical image before moving the focus lens is highest, the original position before moving the focus lens is determined to be the in-focus position of the focus lens and data corresponding to the in-focus position of the focus lens is sent to the control block 23c.

If the contrast value of the captured optical image is greater upon moving the focus lens in the first direction, the focus lens is moved in the first direction, the contrast value is detected, and the latest and second latest detected contrast values are compared. Since then, the movement of the focus lens in the first direction, the detection of the contrast value, and the comparison of the latest two contrast values are repeated. When the latest detected contrast value is lower than the second latest detected contrast value, the position of the focus lens corresponding to the second latest detected contrast value is determined to be the in-focus position of the focus lens and data corresponding to this position is sent to the control block 23c.

If the contract value of the captured optical image is greater upon moving the focus lens in the second direction, the focus lens is moved in the second direction, and similarly with moving in the first direction, the in-focus position of the focus lens is determined.

When the pursuit auto focus function is carried out, the first setting block 31, the pursuit block 32, the second setting block 33, and the third setting block 34 operates as follows, while the detection block 35, the memory block 36, and the determination block 37 operate in the same manner as in the normal auto focus function.

The first setting block 31 designates one unit area among the twenty five unit areas as a standard area, similar to the normal auto focus function. The initial standard area is the same as would be selected in the normal auto focus function. The data corresponding to the designated standard area is sent to the pursuit block 32, the second setting block 33, and the third setting block 34.

Dissimilar from the normal auto focus function, the first setting block 31 receives data corresponding to the scanning area designated by the second setting block 33. When the first setting block receives this data, the first setting block 31 designates the unit area, which was the previously selected scanning area, as the new standard area for the next capture of the image.

The pursuit block 32 pursues a targeted object moving in a frame of an entire image to be captured. First, the pursuit block 32 establishes the unit area, which the first setting block 31 designates as the standard area, as an initial target-imaging area. The pursuit block 32 receives the image data from the AFE 13. Partial data components corresponding to the target-imaging area are extracted from the first frame of the received image data soon after switching on the first switch. When the pursuit block 32 receives the second frame of the generated image data, the pursuit block 32 extracts partial data components, corresponding to the unit areas surrounding the unit area designated as the target-imaging area in the previous frame of the image data, from the second frame of the received image data. The pursuit block 32 than specifies one unit area for capturing the targeted object by carrying out the pattern-matching based on the partial data components extracted from the first and second frames of the image data. The pursuit block 32 designates the specified unit area as the new target-imaging area. Since then, similarly, the pursuit block 32 specifies one unit area for capturing the targeted object from the latest image data, and the target-imaging area is updated. Data corresponding to the updated target-imaging area is then sent to the second setting block 33.

As described above, the third setting block 34 receives the data corresponding to the designated standard area. The third setting block 34 defines an expanded area in a predetermined range from the standard area as a change area based on the designated standard area. For example, one area, formed by nine unit areas arranged in three rows and three columns and including the set standard area in the center, is defined as the change area in the digital camera 10. Data corresponding to the defined change area is sent to the second setting block 33.

The second setting block 33 receives the data corresponding to the designated standard area, target-imaging area, and change area. The second setting block 33 then selects one unit area as the scanning area. First, the second setting block 33 determine whether or not the target-imaging area is within the change area. The second setting block 33 selects the scanning area based on this determination. When the target-imaging area is within the change area, the standard area becomes the selected scanning area. When the target-imaging area is outside of the change area, the target-imaging area becomes the selected scanning area. Data corresponding to the selected scanning area is then sent to the detection block 35 and the first setting block 31.

As described above, the detection block 35, memory block 35, and the determination block 37 operate in the same manner as in the normal auto focus function.

It is explained below how to set the standard area, the target-imaging area, the scanning area, and the change area using FIGS. 5~7.

Figure 5:
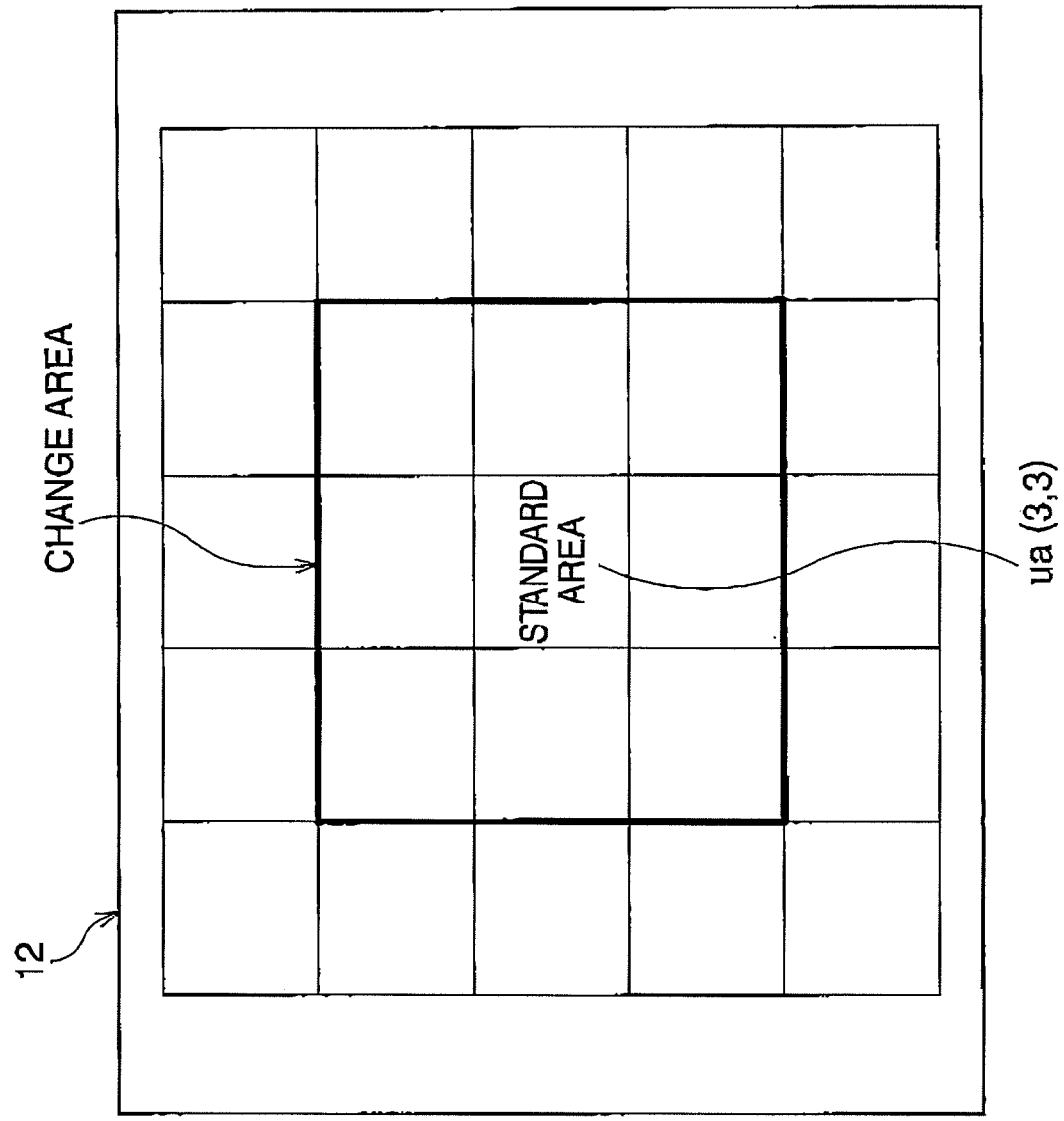
FIG. 5 shows each location of the standard area, the scanning area, and the change area for the first frame of the image data in an effective imaging area soon after switching on the first switch.

As shown in FIG. 5, the ua(3,3) is set as the initial standard area in the first frame of image data soon after switching on the first switch. Further, an area formed by the nine unit areas arranged in three rows and three columns and surrounding the ua(3,3) is defined as the change area based on the designated standard area. Further, the standard area is set as the scanning area.

Figure 6:
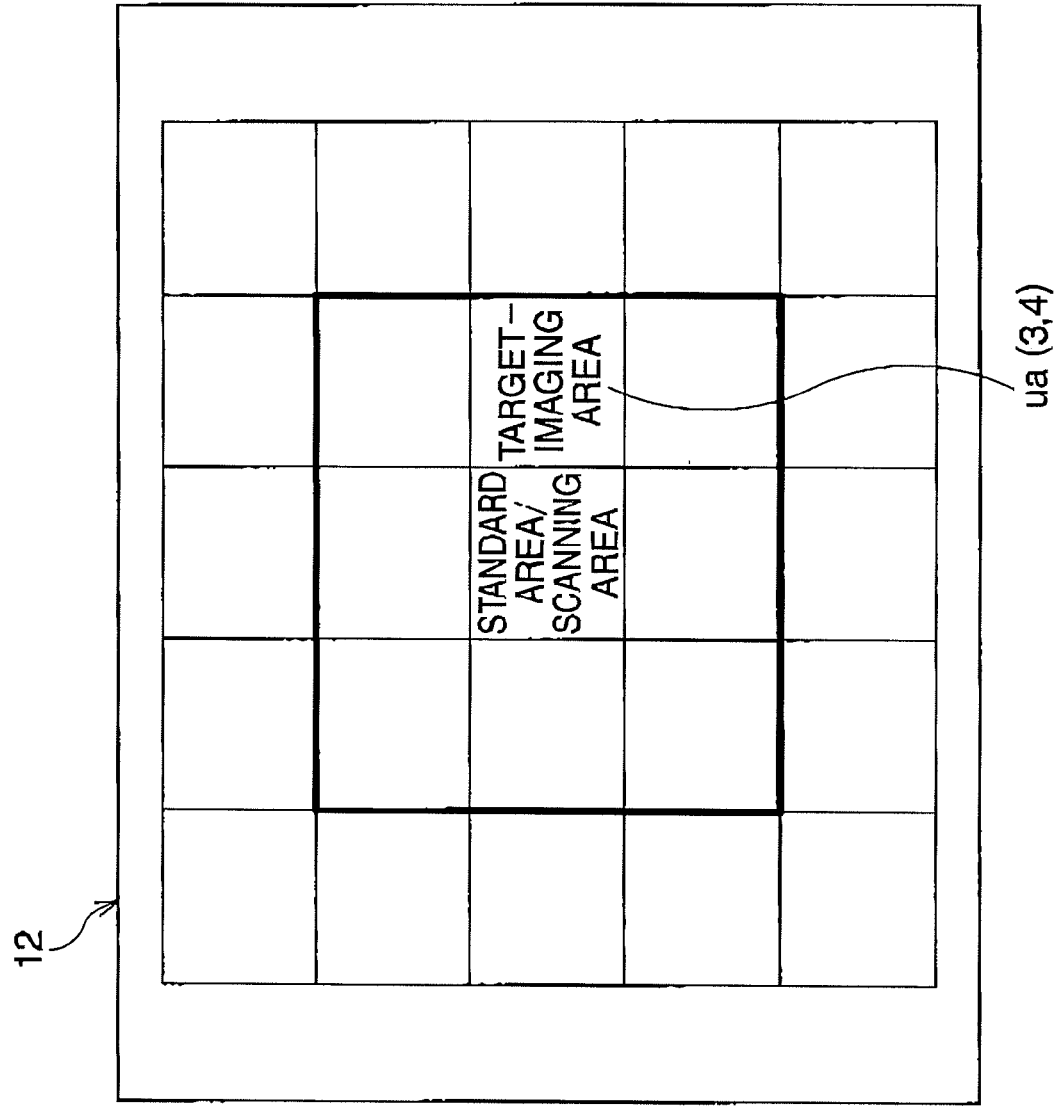
FIG. 6 shows each location of the standard area, the scanning area, the change area, and the target-imaging area for the second frame of the image data in an effective imaging area if the scanning area does not change.

The ua(3,4) is set as the target-imaging area in the second frame of image data if the targeted object moved to a space corresponding to the ua(3,4), as shown in FIG. 6. The ua(3.3), which is the same unit area as the designated standard area in the previous frame, becomes the selected scanning area because the target-imaging area is within the change area. Accordingly, the change area does not change from the previously established change area.

Figure 7:
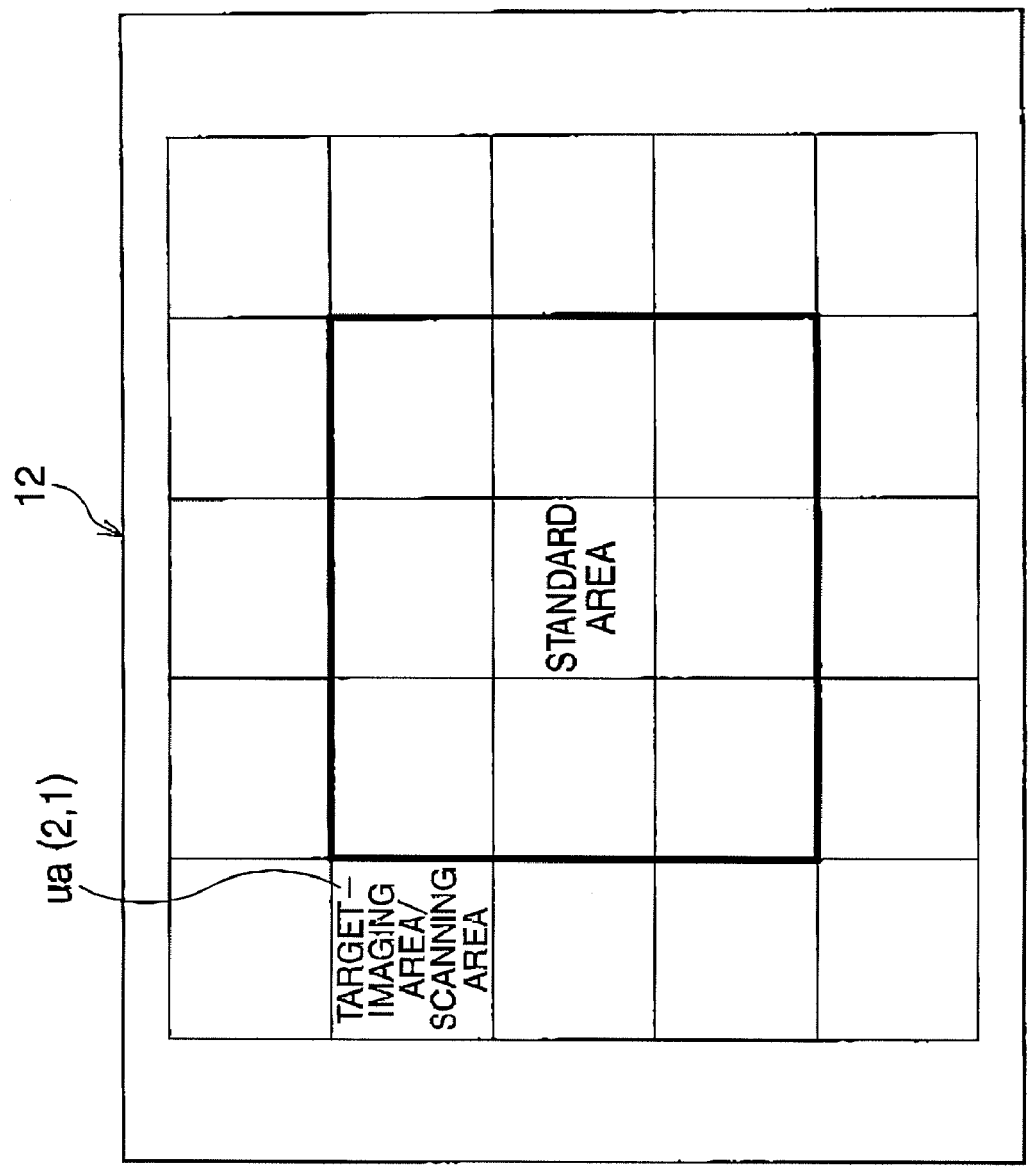
FIG. 7 shows each location of the standard area, the scanning area, the change area, and the target-imaging area for the second frame of the image data in an effective imaging area if the scanning area changes.
Figure 8:
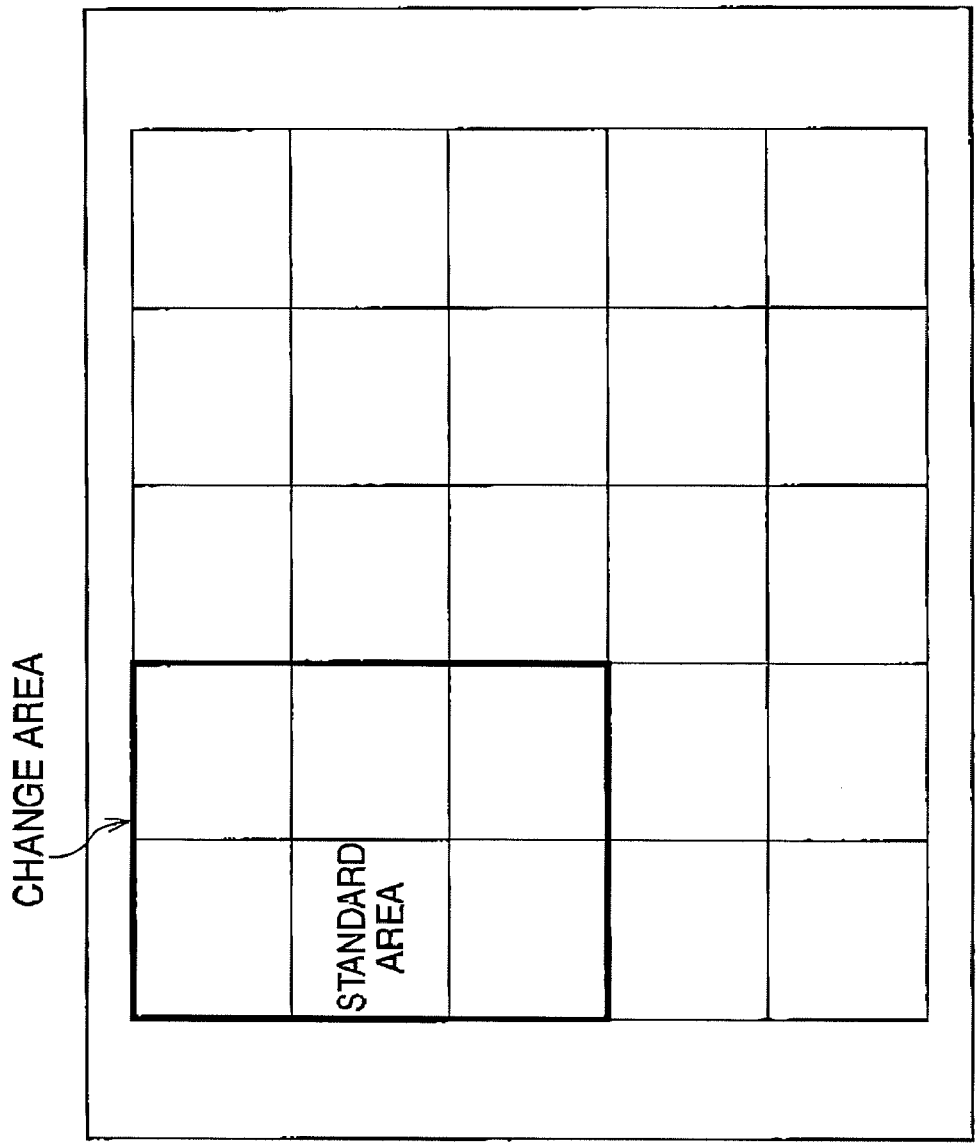
FIG. 8 shows each location of the standard area and the change area not again for the second frame of the image data in an effective imaging area.

The ua(2,1) is set as the target-imaging area in the second frame or the image data if the targeted object moved to a space corresponding to the ua(2,1), as shown in FIG. 7. The ua(2,1), which is the same unit area as set as the target-imaging area in the moment frame, is set as the scanning area because the target-imaging area is outside of the change area. The change area is then updated based on the newly selected scanning area, as shown in FIG. 8.

As explained above, the scanning area does not change unless the targeted object moves through at least two unit areas from the scanning area selected in the previous frame.

Figure 9:
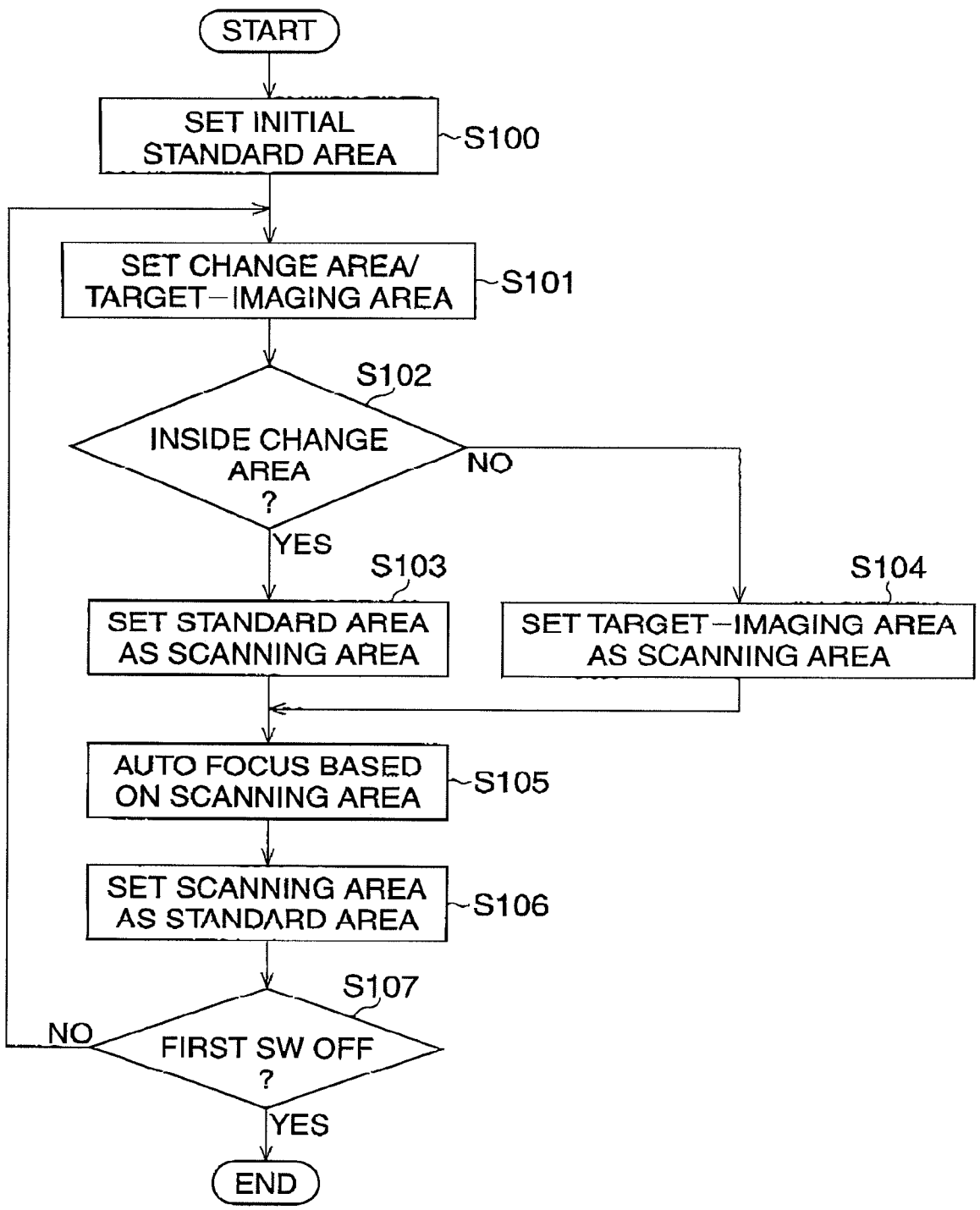
FIG. 9 is a flowchart to explain the process for pursuit auto focus carried out by the DSP.

Next, the process carried out by the DSP 23 in the pursuit auto focus function is explained using the flowchart of FIG. 9. The process for the pursuit auto focus starts when the first switch is switched on by depressing the release button halfway.

At step S100, the initial standard area is set based on the first frame of the image data soon after the first switch is switched on. At stop S101, the change area is defined with the initial standard area at its center and the target-imaging area is established.

At step S102, it is determined whether or not the target-imaging area is within the change area. When the target-imaging area is within the change area, the process proceeds to step S103. When the target-imaging area is outside or the change area, the process proceeds to step S104.

At step S103, the same unit area as the standard area is set as the scanning area. On the other hand, at step S104, the target-imaging area is set as the scanning area.

After step S103 or S104, the process proceeds to step S105. At step S105, the position of the focus lens is adjusted by repeating the contrast value detection process with associated focus lens movements, based on the image data corresponding to the scanning area.

At step S106, the scanning area becomes the new standard area. After setting the standard area, the process proceeds to step S107. At step S107, it is determined whether or not the first switch is switched off.

When the first switch is remains on by keeping the release button depressed halfway, the process returns to step S101, and the pursuit auto focus function is repeated. However, when the first switch is switched off at step S107, the pursuit auto focus function terminates and the process for the pursuit auto focus is complete.

In the above embodiment, it is possible to move the scanning area only when the targeted object moves to a space corresponding to a unit area outside of the change area, which expands from the unit area capturing the targeted object before moving, in carrying out the pursuit auto focus function. Accordingly, the scanning area is not moved when the targeted object moves slightly with in the entire image to be captured, due to hand shake. Consequently, the auto focus of a pursued object can be carried out in a stable manner.

The twenty five unit areas on the light-receiving surface are predetermined to be arranged in five rows and five columns. However, any two dimensional arrangement may be adaptable. In addition, the number of unit areas is not restricted.

The entire optical image, captured by the entire target-imaging area that is the initial standard area soon after the first switch is switched on, is set as the optical image of the targeted object in the above embodiment. However, the targeted object itself may be recognized according to the contour extraction method, and the targeted object itself may be set as the optical image of the targeted object. In this transformation, the unit area capturing a partial optical image of the targeted object may be set as the scanning-area.

The change area is formed with a plurality of unit areas so that the standard area is at the center or the chance area in the above embodiment. However, any areas including the standard area may be defined as the change area. For example, a similar figure of the standard area, of which similar ratio is below three and where the standard area is on the center, may be set as the change area.

The ua(3,3) is initially set as the standard area in the above embodiment. However, another unit area can be set as the initial standard area according to the command input to the input block 14.

The auto focus is carried out according to the contrast detection method in the above embodiment. However, other methods of the auto focus are adaptable. For example, the phase difference detection method can be adapted to the above embodiment.

The targeted object is pursued in the captured image based on the image signal read from the imaging device 12 in the above embodiment. However, the targeted object may be directly pursued without using the image signal. For example, the targeted object can be pursued based on a location-signal that is radiated from a signal-source attached to the targeted object, such as infrared light or a radio wave.

The auto focus unit is adapted to the digital camera 10 in the above embodiment. However, the auto focus unit can be a turn camera with a pursuit apparatus that directly pursues the targeted object without using the image signal.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-045277 (filed on Feb. 22, 2006), which is expressly incorporated herein, by reference, in its entirety.

The invention claimed is:

1. An auto focus unit, comprising:
a pursuit block that pursues movements of a targeted object within a frame of an entire image to be photographed;
a scanning area setting block that designates at least a part of an object-area as a scanning area at a first time, an image of the targeted object being at said object-area within said frame of said entire image, said scanning area being used for focusing an image of an object on a light-receiving surface, said scanning area setting block resets said scanning area after said first time to a new location within said frame of said entire image to which said targeted object has moved;
a change area setting block that designates an area of a predetermined size, based on the location of said targeted object within said frame of said entire image, as a change area at said first time, the scanning area being smaller than the change area and being included in the change area, the change area and the scanning area being separately designated, a time period during which the scanning area is designated at least partially overlaps with a time period during which the change area is designated;
a permission block that controls said scanning area setting block to again reset said scanning area when said location, to which said targeted object has moved, within said frame of said entire image after said first time, is outside of said change area; and
a lens driver that drives a focus lens to move so that an optical image of said scanning area is focused upon said light-receiving surface.

2. An auto focus unit according to claim 1, wherein said change area setting block resets said change area, based on a location of said targeted object when said scanning area setting block resets said scanning area.

3. An auto focus unit according to claim 1, wherein said optical image of said scanning area is focused on said light-receiving surface based upon one of a contrast detection method or a phase difference detection method.

4. An auto focus unit according to claim 1, wherein said scanning area includes said location of said targeted object.

5. An auto focus unit according to claim 4, wherein said scanning area is selected from a plurality of unit areas into which said frame of said entire image is divided, and said scanning area and unit areas surrounding said scanning area form said change area.

6. An auto focus unit according to claim 1, further comprising:
a receiver that receives an image signal from an imaging device, said imaging device generating said image signal when said imaging device receives an optical image of an object upon said light-receiving surface of said imaging device; and
a target setting block that designates said targeted object within a frame of a first entire image corresponding to a first image signal as said targeted object, said receiver receiving said first image signal at the first time;
said pursuit block pursuing said targeted object by detecting the location of said targeted object within said frame of a second entire image corresponding to a second image signal, said second image signal being generated at a second time after said first time;
said scanning area setting block setting, as said scanning area, at least a part of said object-area, in which an image of said targeted object within said frame of said first entire image is located, said scanning area setting block being able to reset said scanning area to a new location within said frame of said second entire image to which said targeted object has moved;
said change area setting block designating, as said change area, an area of a predetermined size based on the location of said targeted object within said frame of said first entire image;
said permission block controlling said scanning area setting block to reset said scanning area of said second entire image when said location, to which said targeted object has moved within said frame of said second entire image, is outside of said change area.

7. The autofocus unit according to claim 1, said permission block being further configured to control the scanning area setting block to again utilize the scanning area designated at the first time, when the location to which the targeted object has moved, within the frame of the entire image after the first time, is inside of the change area.

8. The autofocus unit according to claim 1, said permission block determining whether the location, to which the targeted object has moved, within the frame of the entire image after the first time, is within the change area or is outside of the change area.

9. The autofocus unit according to claim 1, said frame of said entire image being divided into a plurality of unit areas, said permission block being configured to not change the scanning area unless the targeted object has moved through at least a predetermined number of unit areas, from the scanning area selected at the first time.

10. The auto focus unit according to claim 1, resetting of the scanning area being based upon a detected location of the image of the targeted object.

11. A camera, comprising:
a pursuit block that pursues movements of a targeted object within a frame of an entire image to be photographed;
a focus lens that focuses an object on a light-receiving surface;
a scanning area setting block that designates at least a part of an object-area as a scanning area at a first time, an image of the targeted object being at said object-area within said frame of said entire image, said scanning area being used for focusing an image of an object scanning area on said light-receiving surface of an imaging device, said setting block resets said scanning area after said first time to a new location within said frame of said entire image to which said targeted object has moved;
a change area setting block that defines an area of a predetermined size, based on the location of said targeted object within said frame of said entire image, as a change area at said first time, the scanning area being smaller than the change area and being included in the change area, the change area and the scanning area being separately designated, a time period during which the scanning area is designated at least partially overlaps with a time period during which the change area is designated;
a permission block that controls said scanning area setting block to again reset said scanning area when said location, to which said targeted object has moved, within said frame of said entire image after said first time, is outside of said change area; and
a lens driver that controls said focus lens to move so that an optical image of said scanning area is focused upon said light-receiving surface of said imaging device.

12. The camera according to claim 11, wherein said change area setting block resets said change area, based on a location of said target object when said scanning area setting block resets said scanning area.

13. The camera according to claim 11, wherein said optical image of said scanning area is focused on said light receiving surface based upon one of a contrast detection method and a phase difference detection method.

14. The camera according to claim 11, wherein said scanning area includes said location of said targeted object.

15. The camera according to claim 14, wherein said scanning area is selected from a plurality of unit areas into which said frame of said entire image is divided, said scanning area and unit areas surrounding said scanning area form said change area.

16. The camera according to claim 11, further comprising:
a receiver that receives an image signal from an imaging device, said imaging device generating said image signal when said imaging device receives an optical image of an object upon said light receiving surface of said imaging device; and
a target setting block that designates said targeted object within a frame of a first entire image corresponding to a first image signal as said targeted object, said receiver receiving said first image signal at the first time;
said pursuit block pursuing said targeted object by detecting the location of said targeted object within said frame of a second entire image corresponding to a second image signal, said second image signal being generated at a second time after said first time;
said scanning area setting block setting, as said scanning area, at least a part of said object area, in which an image of said targeted object within said frame of said first entire image is located, said scanning area setting block being able to reset said scanning area to a new location within said frame of said second entire image to which said targeted object has moved;
said change area setting block designating, as said change area, an area of a predetermined size based on the location of said targeted object within said frame of said first entire image;
said permission block controlling said scanning area setting block to reset said scanning area of said second entire image when said location, to which said targeted object has moved within said frame of said second entire image, is outside of said change area.

17. The camera according to claim 11, said permission block being further configured to control the scanning area setting block to again utilize the scanning area designated at the first time, when the location to which the targeted object has moved, within the frame of the entire image after the first time, is inside of the change area.

18. The camera according to claim 11, said permission block determining whether the location, to which the targeted object has moved, within the frame of the entire image after the first time, is within the change area or is outside of the change area.

19. The camera according to claim 11, said frame of said entire image being divided into a plurality of unit areas, said permission block being configured to not change the scanning area unless the targeted object has moved through at least a predetermined number of unit areas, from the scanning area selected at the first time.

20. The camera according to claim 11, resetting of the scanning area being based on a detected location of the image of the targeted object.

* * * * *